(12) United States Patent
Ruehle (10) Patent No.: US 9,268,881 B2
(45) Date of Patent: Feb. 23, 2016

(54) CHILD STATE PRE-FETCH IN NFAS

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 13/656,562

(22) Filed: Oct. 19, 2012

(65) Prior Publication Data

US 2014/0115263 A1   Apr. 24, 2014

(51) Int. Cl.
*G06F 12/08* (2006.01)
*G06F 17/30* (2006.01)
*G06F 17/27* (2006.01)

(52) U.S. Cl.
CPC ........ *G06F 17/30985* (2013.01); *G06F 17/272* (2013.01); *G06F 12/08* (2013.01); *G06F 2207/025* (2013.01)

(58) Field of Classification Search
CPC ... G06F 17/30; G06F 12/08; G06F 17/30985; G06F 17/272; G06F 2207/025
See application file for complete search history.

(56) References Cited

U.S. PATENT DOCUMENTS

| 5,485,620 | A  | 1/1996 | Sadre |
| 5,870,576 | A  | 2/1999 | Faraboschi |
| 5,937,181 | A  | 8/1999 | Godefroid |
| 6,122,757 | A  | 9/2000 | Kelley |
| 6,697,276 | B1 | 2/2004 | Pereira |
| 6,700,809 | B1 | 3/2004 | Ng |
| 6,934,796 | B1 | 8/2005 | Pereira |
| 7,119,577 | B2 | 10/2006 | Sharangpani |
| 7,382,637 | B1 | 6/2008 | Rathnavelu |
| 7,539,032 | B2 | 5/2009 | Ichiriu |
| 7,710,988 | B1 * | 5/2010 | Tripathi et al. ............... 370/411 |
| 7,805,392 | B1 | 9/2010 | Steele |
| 7,899,904 | B2 * | 3/2011 | Ruehle .......................... 709/224 |
| 7,945,528 | B2 | 5/2011 | Cytron |
| 8,024,802 | B1 | 9/2011 | Preston |
| 8,051,085 | B1 | 11/2011 | Srinivasan |
| 8,347,384 | B1 | 1/2013 | Preston |
| 8,448,249 | B1 | 5/2013 | Preston |
| 8,516,456 | B1 | 8/2013 | Starovoitov |
| 8,572,106 | B1 | 10/2013 | Estan |
| 8,862,603 | B1 | 10/2014 | Watson |
| 8,964,548 | B1 | 2/2015 | Keralapura |
| 2001/0014936 | A1 | 8/2001 | Jinzaki |

(Continued)

OTHER PUBLICATIONS

Morita, et al. (Apr. 1994). Parallel generation and parsing of array languages using reversible cellular automata. International Journal of Pattern Recognition and Artificial Intelligence, 8(02), 543-561.

(Continued)

*Primary Examiner* — Kevin Verbrugge
*Assistant Examiner* — Francisco Grullon
(74) *Attorney, Agent, or Firm* — Barnes & Thornburg LLP (57) ABSTRACT

Disclosed is a method and apparatus for pre-fetching child states in an NFA cell array. A pre-fetch depth value is determined for each transition in an NFA graph. The pre-fetch depth value is accessed for transition from an active state in the NFA graph. The child states of the active state are pre-fetched to the depth of the pre-fetch depth value recursively. A loader loads the pre-fetched states into the NFA cell array.

27 Claims, 2 Drawing Sheets

(56) References Cited

U.S. PATENT DOCUMENTS

| | | | |
|---|---|---|---|
| 2002/0124162 A1* | 9/2002 | Yung et al. .................... 712/238 |
| 2003/0051043 A1 | 3/2003 | Wyschogrod |
| 2003/0065800 A1 | 4/2003 | Wyschogrod |
| 2004/0162826 A1 | 8/2004 | Wyschogrod |
| 2004/0215593 A1 | 10/2004 | Sharangpani |
| 2005/0012521 A1 | 1/2005 | Sharangpani |
| 2005/0198625 A1 | 9/2005 | Shi |
| 2005/0273450 A1* | 12/2005 | McMillen et al. ................ 707/1 |
| 2006/0101195 A1 | 5/2006 | Jain |
| 2006/0136570 A1 | 6/2006 | Pandya |
| 2006/0277534 A1 | 12/2006 | Kasuya |
| 2007/0130140 A1 | 6/2007 | Cytron |
| 2007/0182540 A1 | 8/2007 | Marman |
| 2008/0034427 A1 | 2/2008 | Cadambi |
| 2008/0046423 A1 | 2/2008 | Khan Alicherry |
| 2008/0059464 A1 | 3/2008 | Law |
| 2008/0071780 A1 | 3/2008 | Ichiriu |
| 2008/0109431 A1 | 5/2008 | Kori |
| 2008/0140600 A1 | 6/2008 | Pandya |
| 2008/0270342 A1 | 10/2008 | Ruehle |
| 2008/0271141 A1 | 10/2008 | Goldman |
| 2009/0063825 A1 | 3/2009 | McMillen |
| 2009/0119399 A1 | 5/2009 | Hussain |
| 2009/0177669 A1 | 7/2009 | Ramarao |
| 2009/0327252 A1 | 12/2009 | Zhang |
| 2010/0095367 A1 | 4/2010 | Narayanaswamy |
| 2010/0191958 A1 | 7/2010 | Chen |
| 2010/0192225 A1 | 7/2010 | Ma |
| 2010/0198850 A1* | 8/2010 | Cytron et al. ................ 707/758 |
| 2010/0229238 A1 | 9/2010 | Ma |
| 2010/0232447 A1 | 9/2010 | Jing |
| 2011/0022617 A1 | 1/2011 | Yamagaki |
| 2011/0093496 A1 | 4/2011 | Bando |
| 2011/0145181 A1 | 6/2011 | Pandya |
| 2011/0196971 A1 | 8/2011 | Reguraman |
| 2011/0219208 A1 | 9/2011 | Asaad |
| 2011/0258210 A1 | 10/2011 | Agarwal |
| 2011/0307433 A1 | 12/2011 | Dlugosch |
| 2012/0011094 A1 | 1/2012 | Yamagaki |
| 2012/0330868 A1 | 12/2012 | Tago |
| 2012/0331554 A1 | 12/2012 | Goyal |
| 2013/0046954 A1 | 2/2013 | Ruehle |
| 2013/0073503 A1 | 3/2013 | Nagao |
| 2013/0111503 A1 | 5/2013 | Tago |
| 2014/0040261 A1 | 2/2014 | Home |
| 2014/0101185 A1 | 4/2014 | Ruehle |
| 2014/0114996 A1 | 4/2014 | Ruehle |
| 2014/0115263 A1 | 4/2014 | Ruehle |
| 2014/0143195 A1 | 5/2014 | Ruehle |
| 2014/0173603 A1 | 6/2014 | Ruehle |
| 2014/0208076 A1 | 7/2014 | Ruehle |
| 2014/0229926 A1 | 8/2014 | Xu |

OTHER PUBLICATIONS

Suejb Memeti, "Automatic Java Code Generator for Regular Expression and Finite Automata", published by Linneaeus Univeristy, Vaxjo, SE, for Degree Project, May 2012, pp. 1-47.

Michela Becchi, Charlie Wiseman, Patrick Crowley, "Evaluating Regular Expression Matching Engines on Network and General Purpose Processors", 5th ACM/IEEE Symposium on Architectures for Networking and Communications Systems (ANCS'09), Oct. 2009, pp. 30-39.

Michela Becchi, Mark Franklin, and Patrick Crowley, "A Workload for Evaluating Deep Packet Inspection Architectures", Workload Characterization, 2008. IISWC 2008. IEEE International Symposium on, Oct. 2008, pp. 79-89.

Michela Becchi, Patrick Crowley, "A Hybrid Finite Automaton for Practical Deep Packet Inspection", CoNEXT '07 Proceedings of the 2007 ACM CoNEXT conference, Dec. 2007, pp. 1-12.

* cited by examiner

CHILD STATE PRE-FETCH IN NFAS

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic. As information is transported across a network, there are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information.

SUMMARY OF THE INVENTION

An embodiment of the invention may therefore comprise a method of fetching destination NFA states in a dynamically configurable NFA cell array, the method comprising determining a policy pre-fetch depth (PFD) value for each transition in the NFA, when any NFA state in the NFA cell array is active, the active state having a transition to a child NFA state, and the transition having a nonzero policy PFD value, pre-fetching the child state into the cell array if the child state is not present and pre-fetching further non-present descendant NFA states of the child state, up to a number of transitions away from the active state equal to said policy PFD value.

An embodiment of the invention may further comprise a method of fetching destination NFA states in a dynamically configurable NFA cell array, wherein a state present in the cell array is active and has at least one transition to at least one corresponding child state, the method comprising determining a pre-fetch depth (PFD) value for each the at least one transition from the active state to the at least one child state, transmitting all non-zero determined PFD values to each at least one corresponding child state, decrementing the transmitted PFD value at each state receiving a transmitted PFD value, transmitting all non-zero decremented PFD values to each successive child state of the state receiving the transmitted PFD value and if any child state for which a non-zero PFD value is destined is absent from the NFA cell array, fetching the absent state into the NFA cell array.

An embodiment of the invention may further comprise a method of fetching destination NFA states in a dynamically configurable NFA cell array, the method comprising generating an original request to fetch an absent NFA state into the cell array, the request having a pre-fetch parameter, returning instructions from an instruction memory to a loader for the absent state, configuring the absent state into the NFA cell array using said instructions, and if the pre-fetch parameter is greater than zero, recursively generating additional requests for each child state of the requested state, the recursively generated requests having pre-fetch parameters one less than the original request.

An embodiment of the invention may further comprise a system for fetching destination NFA states in a dynamically configurable NFA cell array, wherein a state is active and has a transition to at least one child state, the system comprising a loader that is enabled to load states into the cell array, a plurality of instruction queues configured to provide instructions to the loader, comprising at least one external request queue, at least one external request recursive queue and at least one internal request queue, an instruction memory enabled to provide instructions to each of the plurality of instruction queues, and a recursive pre-fetch requester enabled to provide recursive pre-fetch requests to the instruction memory based on a pre-determined pre-fetch depth (PFD) value, the pre-determined PFD value being determined by a compiler for each transition in the NFA, wherein the active state transmits all non-zero PFD values to each corresponding child state which is present in the NFA cell array, the child states decrement the transmitted PFD values received and recursively transmit all non-zero decremented PFD values to successive child states, and if any child state for which a non-zero PFD value is destined is absent from the NFA cell array, the cell array provides an internal fetch request to the instruction memory to fetch the absent state into the NFA cell array.

DETAILED DESCRIPTION OF THE EMBODIMENTS

Regular expressions provides a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
- the sequence of characters "car" appearing consecutively in any context, such as in "car", "cartoon", or "bicarbonate"
- the sequence of characters "car" occurring in that order with other characters between them, such as in "Icelander" or "chandler"
- the word "car" when it appears as an isolated word
- the word "car when preceded by the word "blue" or "red"
- the word "car" when not preceded by the word "motor"
- a dollar sign immediately followed by one or more digits, and then optionally a period and exactly two more digits (for example, "$100" or "$245.98").

These sequences are simple and are intended only for purposes of example. Specifications of great complexity are conveyable by regular expressions, as well as by other types of rule sets.

Abstractly, an NFA is a directed graph of NFA states, in which each graph edge is labeled with a class of input symbols that it accepts, representing a transition from a source state to a destination state on that symbol class. One or more "start states" are understood to be "active" at the beginning of a stream (or sequence) of input symbols or characters. As each symbol in the stream is consumed, an active state may transition to a destination state along a graph edge labeled with a class containing that symbol, so that the destination state becomes active after that symbol. The class of symbols labeling an NFA transition may be called a character class, or CCL, as discussed above.

Regular expressions or similar rules may be matched by executing an NFA (nondeterministic finite automaton) by the Thompson NFA execution algorithm in a dynamically reconfigurable hardware NFA cell array. A method of dynamically reconfiguring a hardware NFA cell array is described in U.S. Pat. No. 7,899,904 to Ruehle, which is incorporated herein in its entirety. In such architectures, an NFA state may be launched into the cell array. The state becomes "active" at a time corresponding to a chosen position in an input symbol stream when a corresponding expression begins to match. Each active cell may have transitions to other "child" NFA states. These "child" states may or may not be present in the cell array. Each transition will have an associated symbol class and when associated cell logic detects an input symbol matching this class, the cell will attempt to signal the child state to become active after that symbol is consumed. Thus, the expression match will progress through the NFA toward an accepting state. However, if the child state is not present in the cell array, consumption of input symbols will be required to stall while instructions are fetched from an instruction memory or cache in order to configure the child state. For purposes of this discussion, it is understood that a "child" state is a destination state from an active state upon a transition based on a rule match to an input symbol from the input stream. "Child" state and destination state may be used interchangeably throughout this description. Likewise, a "parent" state is an active state or may be a destination state that has further destination states as matches progress through the NFA. "Parent" state and active state may be used interchangeably throughout this description.

In the '904 patent, it is described that an active parent state senses through the cell array's signaling crossbar whether its child state(s) are present. It is understood, that for a child state to be not present, it means that the particular child state is not currently loaded into a cell of the array and the cell must be configured (dynamically) so that it is. If a child state is not present in an NFA cell array and an input symbol is consumed causing a transition to that child, the parent state cell commands a stall of processing by the cell array. This stall is performed rather than sending a transition signal to the child sate directly through the crossbars. The parent cell sends a fetch request signal comprising a reference to the child state to a shared NFA instruction memory or cache. Upon receiving the fetch request, the instruction memory or cache accesses the instructions associated with the child NFA state and sends them to a loader module. The loader module then uses them to configure an available cell in the array to contain the child state. It then immediately activates the appropriate child state that has been configured in the cell array. This is all done after the fetch delay because the child state was not present in the cell array. As is apparent, child states are loaded into the cell array only when it is time for them to become immediately active. This can be due to an internal state transition from an active NFA state to a destination, or from an external launch where expression matching began. It is understood that the external launch can come from outside of the NFA itself, for example from a DFA utilized to initiate matching or from a hash table used for the same purpose.

In an embodiment of the invention, stalls due to loading of new states into the cell array caused by the child state not being configured are minimized. Further, in an embodiment of the invention, eviction of earlier loaded inactive states, which may be required for later transitions, is minimized. With a potentially large number of different regular expressions, or other such rules, each with several associated NFA states, there may be many more NFA states than cells in the array. If a wide variety of states are activated over time, the frequency of stalls to load states may become high. Accordingly, load on demand may result in serial, or at least many, fetch stalls.

In an embodiment of the invention, a pre-fetch policy is established for an NFA. The pre-fetch policy may take the form of a "pre-fetch depth" (PFD) parameter associated with each edge of the NFA graph. It is understood that an edge is a transition from one state to another based on a match. Accordingly, whenever a parent state is active in a cell array the child state, subsequent child states (grandchildren, so to speak) reachable by the PFD quantity of steps, PFD=3 for example, shall also be present and configured in the cell array. Thus, for example, if there is a chain of state transitions, A→B→C→D→E, and state A is active in the cell array, the PFD value for the first transition from A to B is acknowledged. If that first transition has a PFD=3, then the pre-fetch policy indicates that the next 3 states from the currently active state will also be present and configured in the cell array, B, C and D. It is understood that this policy may not be absolute due to cell array size and the number of currently active states and the possibly numerous next states. Accordingly, the policy is that the child states to the PFD value are configured in the cell array immediately or as soon as possible.

The pre-fetch policy may be limited by low PFD values encountered along the way. This may be such that the requirement for states several levels away from an active state does not extend through any intervening transitions further than the PFD value associated with the particular current transition. In the above example of A→B→C→D→E, where state A is active and the PFD=3 for the transition from A to B, the pre-fetch depth may be limited by the successive PFD values for subsequent transitions. For instance, if the PFD=1 for the transition from B to C, then only states B and C are required to be fetched and configured by the pre-fetch policy. Also, by example, if the B to C transition has a PFD=0, then only state B must be fetched and configured in the cell array to satisfy the policy.

The pre-fetch policy, i.e. the PFD values associated with all of the NFA transitions, may be determined by a compiler or other tool. The determination may be made by relatively simple rules or heuristics. The policy may take into account the size of the cell array relative to the expected number of active states at any given time, the expected latency required to fetch a new state into the cell array, the number of children and descendants of a parent state at various depths, the estimated probability that descendant states will become active, and the estimated speed of transitions from parent to child to child, successively. For example, it typically takes 12 cycles to fetch a new state, and it is estimated to typically take 20 cycles after state B becomes active before it will transition to state C (e.g. state B represents the regular expression fragment [a-z] {20,50}, which will spin for a minimum of 20 cycles), the PFD=1 may be a logical value on the A to B transition. This is so because after activating state B, there should be plenty of time to fetch state C, or other destination states, before it is needed for a transition from state B. Contrarily, it is estimated to take only 8 cycles after state B is activated before it will transition to C, and it will take another 8 cycles for C to transition to D, then PFD=2 may be a logical value on the A to B transition. It is understood, that cell space considerations may also impact the PFD value limitation as stated above. If state X has 5 children and 25 grandchildren (5 children from each of the 5 children, for example) it may be efficient to limit the PFD=1 on each transition from X to a particular destination state. This will avoid configuring 30 child states every time state X becomes active, with PFD=2 for example.

In an embodiment of the invention, states that are to be configured into the cell array may be so configured in the background. Scanning of the input stream is not interrupted and remains in progress by the array when configuration is done in the background. The background method allows for the pre-fetching of states into the cell array without those states being immediately active. In an embodiment of the invention, configuring states into the cell array is decoupled from activating the states. Accordingly, loading/configuring of states is a separate activity from activating of states, which may be by transition signals from state to state with in the array or by signals from external sources when an expression begins to match, as described above.

Figure 1:
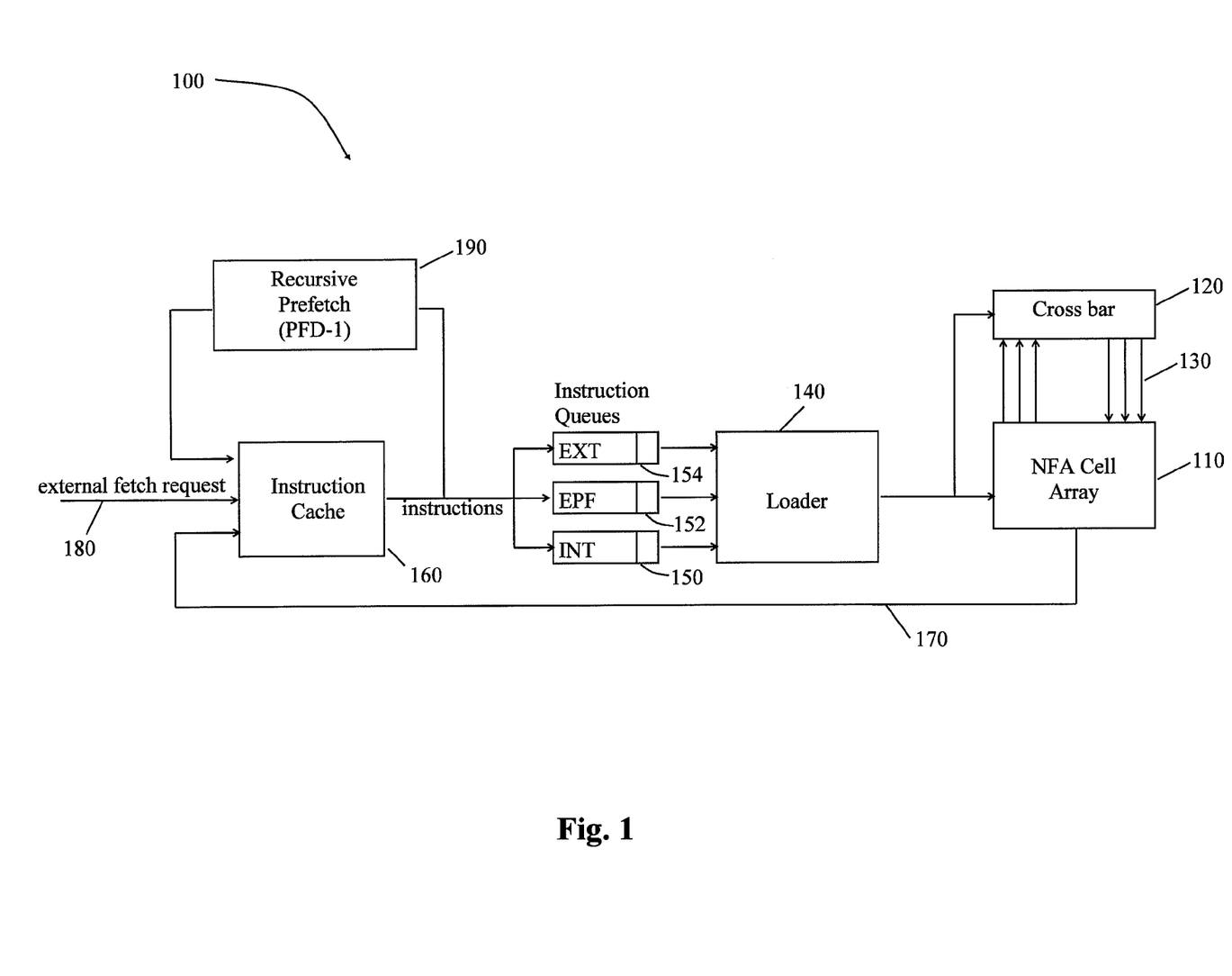
FIG. 1 is block diagram of an NFA pre-fetch architecture.

FIG. 1 is block diagram of an NFA pre-fetch architecture. The pre-fetch architecture 100 has an NFA cell array 110. As noted above, and as is consistent with the precepts of the '904 patent, the NFA cell array is dynamically configurable wherein the cells establish, de-establish and re-establish connections 130 to each other by way of a crossbar 120. A loader 140 is connected to each of the NFA cell array 110 and the crossbar 120. The loader 140 is enabled to configure the NFA cell array by loading "dormant" states into the cell array and to make connections 130 between the states in the array via the crossbar 120. In an embodiment of the invention, three instruction queues are connected to the loader 140. The three instruction queues are an external request queue (EXT) 154, an external request recursive pre-fetch queue (EPF) 152 and an internal requests and recursive pre-fetch queue (INT) 150. The loader 110 may load one instruction from the queues 150,152,154 at a time. The loader will look at the queues and load according to each queue. It is understood that there may be additional queues. For instance, there could be extra EPF and INT queues. However, additional queues create additional costs. In one embodiment of the invention, the loader 140 processes the queues according to a priority policy. The loader may process the INT queue with highest priority due to the fact that internal requests originate from active states or their descendents related to a match and NFA descent that is in progress. The EXT and EPF may have additional time to load. As such, the EXT 154 and the EPF 152 are not free flowing queues, and the loader may be waiting until the right position in the input stream to load pre-fetches from these two queues. The three queues are more fully discussed below.

An Instruction Cache 160 provides instructions to the queues 150,152,154 according to the source of the pre-fetch instruction. The pre-fetch instruction may originate from a progressing internal match 170 within the cell array 110. The pre-fetch instruction may originate from an external fetch mechanism 180 such as a DFA or a hash table. The pre-fetch instruction may originate from a recursive pre-fetch 190 from a previously fetched instruction, such as where a transition is PFD=3. For each recursive pre-fetch, the PFD will be decremented by one and a pre-fetch instruction will be sought as long as the PFD value is not 0 (zero).

Loading a new NFA state into the cell array is initiated by communicating a state fetch request to the NFA instruction memory or cache 160. In the instruction memory or cache 160, the request identifies which instructions are used to configure the needed state(s), such as by a first instruction and a count. A state fetch request may originate from an NFA cell containing a parent of the requested state, or from an external source such as an external DFA engine or a hash table which may match the beginnings of some expressions. In an embodiment of the invention, a state fetch request may also carry a PFD value. The value will range from 0 to a maximum limit. Although the maximum may be arbitrarily determined, a limit of 3 to the PFD value may provide a practical balance between the desire to have sufficient levels of child states available in the cell array and the space available for states in the cell array. The instruction memory or cache, or control logic attached to such memory or cache, uses the request PFD to recursively pre-fetch descendants of the requested state, to a maximum depth equal to the PFD value. When the request PFD value is nonzero, the recursive pre-fetch may be accomplished by a genuine recursion. By genuine recursion it is meant by identifying each child transition of the requested state (e.g. by accessing and interpreting the instructions associated with the requested state), and for each child, issuing another state fetch request for that child state. The successive pre-fetch requests will be tagged, or labeled or annotated, with the previous request's PFD value minus one. By the same system, the child requests may generate grandchild requests until the recursion terminates when a request's PFD value is 0. The PFD value is decremented at each step in the recursion.

In an embodiment of the invention, a state fetch request's PFD may be separately restricted by the PFD of each transition from the requested state to a child state. If a transition to a child has PFD=0, then no recursive pre-fetch of that child will be made. Otherwise, a recursive fetch request is issued using the lower of two values—the original request PFD and the transition PFD, minus one in either case.

State fetch requests are processed by accessing the referenced NFA instructions and sending them to the cell array loader 140. The loader 140 will select available cell(s) in the array 110 and configure them with the requested state using the accessed instructions from the memory 160.

As noted above, situations may occur where the number of states desired to be pre-fetched may not be accommodated by the size of the cell array. At this point, a policy will determine which child states will be fetched and also which previously fetched states will remain in the cell array 110. Recursive pre-fetch by the NFA instruction memory or cache may be optimized by declining to pre-fetch states that have already been recently pre-fetched and known to still be present in the cell array. Previously pre-fetched states may also be in process of being loaded into the cell array or may be in the queue waiting for loading. Suppressing redundant pre-fetches allows for reduction of stress on the instruction memory or cache—and on the state loading logic in the loader 140. In an embodiment of the invention, a method of suppressing redundant pre-fetches is to store a limited number (e.g. 16) of recent pre-fetch requests in an array of registers and compare each new pre-fetch request with each request in the array. Any matched requests are dropped. When the register array is full, the least recent request may be dropped to make room for another. The instruction memory or cache is connected to the cell array's eviction logic to receive a notice of each evicted state. When any state matching a request in the array is evicted from the cell array, it is also deleted from the recent pre-fetch array so that it may again be pre-fetched. In an embodiment of the invention, rather than using such a recent pre-fetch request array, each new pre-fetch request may be directly compared with the state present in each cell of the NFA cell array and dropped on a match.

When a state fetch request originates from an external source based on matches to the beginning of an expression, the state is intended to be activated at a particular position in the input symbol stream. This may be after the last symbol of the entrance fragment matched by the external source. This is so that the activated state can continue comparisons to the input stream uninterrupted. In this case, and in the context of efficiently fetching states for configuration in the cell array, the loading of the requested state may be delayed until a limited distance, e.g. 16 symbols, before the planned activation position. This is to avoid cluttering the cell array with states that will not be needed for a long time. This delay is best understood relating the relative position of an external source, such as a DFA engine, with the NFA active states. The DFA engine may be operating several hundred symbols ahead of the position that the active states in the NFA are operating.

When an instruction cache is used, it may be advantageous to access the instructions for the requested state as early as possible, because there may be a cache miss which will require several cycles. However, the accessed instructions may be queued and delayed from loading until near the pre-determined activation position. When recursive pre-fetch is performed for such an external state fetch request, likewise the pre-fetched descendant states may be delayed from loading until the same position—until after the parent sate is loaded. To facilitate loading pre-fetched children immediately after their parent states, it may be advantageous to store delayed parent states in one queue and the pre-fetched child states of that parent in another queue. This is because if they were stored in the same queue, they may get separated by state instructions from other external fetch requests, which may be scheduled to load at later positions, which could interfere with the goal of loading pre-fetched descendent states immediately after their parent states. It may also be advantageous to have separate parallel queues for parents, first-level children, second-level children, and so forth up to the maximum PFD value allowed by a policy in use for the particular NFA. It is understood that additional queues are expensive in terms of resources and costs. Accordingly, it is thereby understood that one queue may be used for all levels of pre-fetched child states. It may also be advantageous to use a separate queue for instructions fetched by internal requests from parent states in the cell array which do not need to be delayed, but may need a queue to wait in until the loader 140 is ready to process the request. The queue can serve for instructions from original internal requests as well as their ensuing recursive pre-fetches. This is so because neither type is meant to delay long in the queue. Accordingly, a set of at least three instructions queues as shown in FIG. 1 is advantageous—one for external requests 154, one for external request recursive pre-fetches 152 and one for internal requests and recursive pre-fetches 150.

The recursive pre-fetch by the instruction memory or cache is adequate to enforce the pre-fetch policy for state fetch requests from an external source matching the beginnings of expressions. Typically, the external source will run some distance ahead of the NFA cell array in the symbol stream, such as 50, 100 or more symbols ahead. This may be such because of occasional intervening delays on the NFA side such as cache misses. When the difference in positioning of the external source and the NFA is established, there is time for the instruction memory or cache to process each external request and its associated recursive pre-fetches and queue the resulting instructions up in the EXT 154 and EPF 152 instructions queues, before the loader 140 is ready to load the requested state, at a predetermined distance ahead of its planned activation position. When the requested state is activated, all of its pre-fetched descendants can be already loaded and present in the cell array—satisfying the pre-fetch policy.

However, recursive pre-fetch by the instruction memory or cache may require modification to enforce the pre-fetch policy after further state transitions occur inside the cell array. For example, assume a state transition sequence of A→B→C→D→E where state A is launched into the cell array by an external request, where the PFD=2 on the transition from A to B. Accordingly, states B and C will be pre-fetched into the cell array. As discussed above, at the proper symbol position, state A will activate and states B and C will be present in the cell array. In such an instance, the pre-fetch policy will be satisfied. However, also assume that state A transitions to B within the cell array and B transitions to C so that state C is the currently active state. If the transition from C to D has a pre-fetch policy that is a non-zero value then the pre-fetch policy is no longer satisfied. When the time comes for C to transition to D, a stall will occur. Accordingly, another pre-fetch mechanism is required to ensure that future descendant states have been pre-fetched.

The pre-fetch policy is additionally enforced within the cell array by a system of pre-fetch signaling from parent states to child states in the array. Each state loaded in the array is able to signal to each of its child states which is also present in the array, through the cell communications crossbar 120. When a parent state is active, and a PFD value on a transition to a child state present in the array, the parent state signals the PFD value to that child state. The child state, receiving the PFD value, signals the PFD value −1 through the crossbar to each of its children in the array. This continues until the PFD value is zero. In this manner, decrementing PFD values are transmitted by multiple passes through the crossbar from a parent state to multiple levels of descendent states and descendent states up to the original PFD value removed from the parent will receive nonzero PFD values. This system of PFD value communication effectively traces out the tree of descendent states that should be pre-fetched below the active parent state. If all such descendants are present array, the pre-fetch policy will be seen to be satisfied.

Whenever a parent state in the array, active or inactive, attempts to transmit a nonzero PFD value to a child state, but the child state is not present in the array, the parent state may immediately generate a state fetch request for the missing child state to the instruction memory or cache. This may have the effect of enforcing the pre-fetch policy when it is not otherwise satisfied. Advantageously, when the parent state generates the fetch request instead of signaling a nonzero PFD value, the request will carry this PFD value minus one. This will leverage the recursive pre-fetch capabilities of the instruction memory or cache to obtain the desired depth of descendent states more quickly than if they are requested one at a time.

Figure 2:
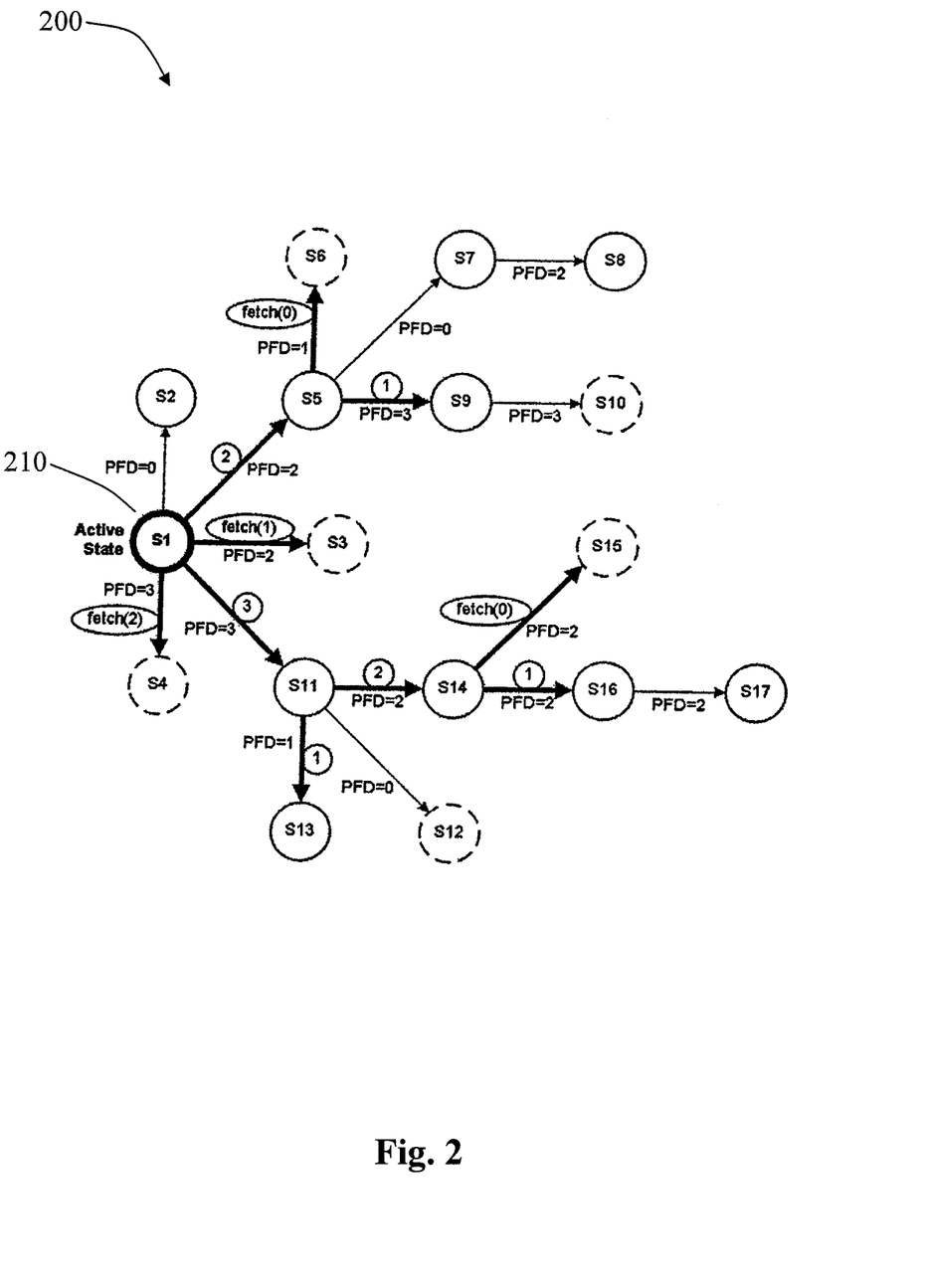
FIG. 2 is an NFA graph showing pre-fetch.

FIG. 2 is an NFA graph showing pre-fetch. In the NFA graph 200, an active state S1 210 is shown in bold. Descendent states S2 to S17 are also shown, with S3, S4, S6, S10, S13 and S15 having dashed outlines to indicate that they are not currently present in the NFA cell array. Each transition is labeled with a PFD value from 0 to 3, representing the pre-fetch policy and the value attributed to each transition by the compiler. Transitions drawn with heavy lines are either signaling a PFD value, shown in a small circle, from parent to present child, or requesting fetch of an absent child, indicated by "fetch(N)", where N is the pre-fetch parameter of the fetch request. For ease of reference, those transitions drawn with heavy lines as indicated above are the following transitions: S1-S3, S1-S4, S1-S5, S1-S11, S5-S6, S5-S9, S11-S14, S11-S13, S14-S15 and S14-S16.

Throughout this discussion of FIG. 2, as well as elsewhere in the Detailed Description, the term "PFD value" is used to represent the static pre-fetch policy assigned to each NFA transition. Also, the same term is used to describe a dynamic signal sent from parent states to child states. As the example NFA in FIG. 2 illustrates, these two understandings of PFD value are often not equivalent. As noted in this description, a PFD value which is "of or on a transition" is a static policy value. A PFD value "signaled" or "received" has the dynamic meaning, such that it is not a constant, but may be altered are decremented by a state before transmission to a next state. The usage of the term "PFD value" will be utilized throughout to describe both instances of PFD values as noted. Is understood by those skilled in the art that there is such a distinction.

Returning now to FIG. 2, active state S1 has one transition to S2 with PFD=0, so no PFD value (or equivalently, PFD value zero) is signaled to S2. S1 has transitions to children S3 and S4 with PFD=2 and PFD=3, respectively. Those respective PFD values would be sent to the destinations, S3 and S4, but cannot, because S3 and S4 are not currently present in the cell array, as denoted by the dotted circles. Accordingly, a fetch request is generated for S3 with a pre-fetch parameter of 1 (2−1=1), and a fetch request is generated for S4 with a pre-fetch parameter of 2 (3−1=2). The cache will return instructions for states S3 and S4 to the loader which will configure them into NFA cells. Further, the cache will generate recursive pre-fetch requests for up to 1 level of descendants of S3, and up to 2 levels of descendants of S4.

S1 also has a transition with PFD=2 to S5, so a PFD value of 2 is signaled to S5. Receiving this PFD value, S5 will compute a residual PFD value of 1 (2−1=1). S5 then has that residual PFD value of 1 to signal to its respective children. In turn, S5 has a transition with PFD=1 to absent child S6. A fetch request for S6 is generated with a pre-fetch parameter of 0 (1−1=0). The cache will return instructions for state S6, but will not generate any recursive pre-fetch requests for descendants of S6. No PFD value is signaled from S5 to child S7 because that transition has a PFD=0. A PFD value of 1 is signaled from S5 to child S9 because that transition's PFD=3 exceeds the residual PFD value of 1. When state S9 receives PFD value 1, it computes a residual PFD of 0 (1−1=0) and does not generate a fetch request for its absent child, S10.

S1 also has a transition with PFD=3 to child S11. PFD value 3 is therefore signaled to S11. S11 computes a residual PFD value of 2 (3−1=2) which it will in turn signal to its children. S11 has an absent child, S12, but its transition has PFD=0, so no fetch is requested. S11 has a transition to a present child, S13, with PFD=1. Since PFD=1 is less than the residual PFD value, shown computed above, the PFD value signaled to S13 is limited to 1. S11 also has a transition to S14, with a PFD=2 matching the residual pre-fetch, so PFD value of 2 is signaled to S14.

S14 will receive the PFD value of 2 and compute its residual PFD value of 1 (2−1=1). S14 has a transition with PFD=2 to absent child S15. S14 requests a fetch of S15 with a PFD value of 0 (1−1=0). S14 also has a transition to present child S16 with PFD=2. This exceeds the residual PFD value of 1 which is signaled to S16. S16 computes a residual PFD value by decrementing the received value to 0. No PFD value is signaled to S17.

By this example shown in FIG. 2, an embodiment of the invention of signaling decrementing PFD values out to descendants of an active state S1 is shown. It is also shown how fetch requests may be generated for absent descendants conditionally, as necessary to satisfy the pre-fetch policy. In this example, it is further shown that if an absent descendant, such as S3, S4, S6 or S15 are desired to be present in the cell array according to the pre-fetch policy, and are accordingly fetched. After these previously absent states are fetched and loaded into the cell array, along with appropriate further descendants of S3 and S4, to the extent that they exist, the pre-fetch policy is satisfied. It is not necessary to fetch states S10 or S12, due to PFD values, whether residual or determined, to satisfy the pre-fetch policy. They are accordingly not fetched and an efficient utilization of the cell array is maintained. States S2, S7, S8 and S17 are unnecessarily present according to the pre-fetch policy, and may be evicted if free cells are required in the array.

Transmission of PFD values through multiple levels of descendent states may be pipelined so that only one level of PFD communication occurs each clock cycle. For example, if states A→B→C are all in the cell array, with PFD=2 on all transitions, and state A becomes active, then PFD=2 may be signaled from A to B that cycle. PFD=1 may be signaled from B to C in the following cycle instead of in the same cycle as the first transition. Such pipelining may be constructive because signal communication through the crossbar 120 may take substantial time and permitting two or more sequential trips through the crossbar in a single cycle may restrict the maximum clock frequency of the cell array, thus reducing performance.

PFD values may be communicated from parent states to child states using a "right filled" encoding in which each possible nonzero PFD value has a separate bit in the signal. Accordingly, if a maximum PFD of 3 is supported, a three bit signal will be used. The number of bits utilized will be equal to the PFD maximum value. PFD values on a transition of 0, 1, 2, and 3 may then be encoded as "000", "001", "011" and "111", respectively. The number of 1s is equal to the PFD value and are filled in at the right end. This methodology allows ease in PFD value comparison. In some NFA graphs many parent states may share the same child state. If all are present in the array, many parent states may attempt to communicate different PFD values to the same child state. However, the crossbar will only deliver one PFD value to the child state. In order for the largest PFD value from a valid parent to be delivered to the child state, the "right filled" method allows this. Simple ORing of the competing PFD bits provides the largest PFD value. For example, if PFD values 1, 0 and 2 are being transmitted to a child state, bit values of "001", "000" and "011" will be ORed resulting in a PFD of "011" or PFD=2.

The pre-fetch signaling may be limited by low PFD values encountered in transitions along the way. For example, assume states A→B→C→D→E are present in the cell array, with state A active, and where the A to B transition has PFD=3, but the B to C transition has PFD=1. State A, when active, will signal PFD=3 to inactive child state B. As discussed above regarding decrementing PFD values, state B would transmit PFD=3−1=2 to state C. However, because the B to C transition has a lesser PFD value, state B will instead signal only PFD=1 to state C. The PFD signaling will stop there.

In conjunction with the pre-fetch policies and maintaining child states in the cell array to avoid stalls, in an embodiment of the invention, a dynamically reconfigurable NFA cell array will likewise have an eviction mechanism. Inactive states may be evicted from the cell array to make room for new states to be loaded. Ordinarily, active states are never evicted unless some occurrence such as an overflow of available cells causes an active state eviction. Accordingly, to support the pre-fetch policy, it is also advantageous to protect from eviction any inactive state receiving a nonzero PFD value from its parent. Otherwise, states required to satisfy the pre-fetch policy may be evicted in order to make room for higher priority states according to this policy.

It is understood, that protecting every state receiving nonzero PFD from eviction may also run into situations where room in the cell array is simply not available. The cell array may run out of room without states evict-able because a few active parent states are protecting trees of large numbers of descendent states. In such a situation, a compromise policy is to only protect direct children of active states from eviction, but not deeper descendants of active states. This would be so regardless of PFD values. The pre-fetch policy may initially pre-fetch a series of descendant states below an active parent state, but later when space is needed, lower descendants may be evicted. This would leave previously discussed pre-fetch policies unsatisfied. Also, a pattern of oscillation may occur where the evicted state may be pre-fetched again to satisfy the pre-fetch policy but then be evicted to provide space and then get pre-fetched again and so on. Care must be taken to prevent or dampen such oscillation by limiting child state fetch requests, such as having an inactive parent state, receiving PFD>1, only pre-fetch its child state once. But if such an inactive parent state stops receiving PFD>1, and later receives PFD>1 again, it may be permitted to pre-fetch its child again, without fear of oscillation.

The two pre-fetch policy enforcement mechanisms described above provide for enforcement of typical pre-fetch policies over time—as the active state subset in the cell array evolves. Active states launched by an external source are loaded along with descendants using recursive pre-fetch in the instruction memory or cache. Typically, the pre-fetch policy is initially satisfied when an externally launched state becomes active. Inside the cell array, PFD value signaling through the crossbar will then trace out the tree of descendent states that should be present by policy. If any are missing, their parent states will generate fetch requests to satisfy the policy. Later, as further states become active due to transitions from their parents, crossbar PFD signaling will extend the PFD policy further—generating additional state fetch requests wherever the policy becomes unsatisfied so that the policy again becomes satisfied. Inactive states that should be present per pre-fetch policy are protected from eviction with the limits of the selected eviction protection scheme utilized to keep the policy satisfied as cell space allows. Conversely, as states fail to match input symbols and become inactive, they will drop of eviction protection from PFD signaling, freeing up room for new states.

Use of embodiment of the invention requires a dynamically reconfigurable hardware NFA cell array implemented to execute a Thompson type matching algorithm. That implementation will then need to be modified to support and decode PFD values in instructions for NFA state transitions, to receive PFD values at the instruction memory or cache with state fetch requests and recursively generate additional state fetch requests for children of the requested state. Instructions from different sources, EXT, EPF and INT, are provided to separate queues and states are loaded using the instructions from these queues. Decrementing PFD values are transmitted from active states to descendant states in the cell array through crossbars. State fetch requests are generated for missing child states. Child states are also protectable from eviction. Also, a compiler that translates a set of regular expressions or similar rules into and NFA using well known algorithms is needed. The compiler should produce a pre-fetch policy in the form of PFD values associated with each NFA state transition and encode PFD values in the NFA instructions.

Having such a modified NFA cell array implementation along with a modified NFA compiler appropriate to that implementation, a set of regular expressions or other rules to be matched, and one or more streams of input symbols to match those rules with, a user or application can use the embodiments of the invention to determine matches to the rules.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of fetching destination NFA (nondeterministic finite automaton) states in a dynamically configurable NFA cell array, said method comprising:
    determining a policy pre-fetch depth (PFD) value for each transition in the NFA, wherein said PFD value indicates a number of successive transitions from a current state to successive child states;
    when any NFA state in the NFA cell array is active, said active state having a transition to a child NFA state, and said transition having a nonzero policy PFD value, pre-fetching the child state into the cell array if said child state is not present; and
    pre-fetching further non-present descendant NFA states of said child state, up to a number of transitions away from the active state equal to said policy PFD value.

2. The method of claim 1, wherein the policy PFD value for each transition in the NFA from a parent state to a child state is determined according to a maximum number of consecutive state transitions that could occur from said child state when it is active in the cell array in less time than required to fetch another descendant state into the cell array.

3. The method of claim 1, wherein the policy PFD value for each transition in the NFA from a parent state to a child state is determined according to a probable number of consecutive state transitions that could occur from said child state when it is active in the cell array in less time than required to fetch another descendant state into the cell array.

4. A method of fetching destination NFA (nondeterministic finite automaton) states in a dynamically configurable NFA cell array, said method comprising:
    generating an original request to fetch an absent NFA state into the cell array, said request having a pre-fetch parameter, said pre-fetch parameter indicating a number of transitions from a current state to successive child states;
    returning instructions from an instruction memory to a loader for the absent state;
    configuring the absent state into the NFA cell array using said instructions; and
    if the pre-fetch parameter is greater than zero, recursively generating additional requests for each child state of the requested state, the recursively generated requests having pre-fetch parameters one less than the original request.

5. The method of claim 4, further comprising suppressing redundant recursively generated requests.

6. The method of claim 5, wherein said step of suppressing comprises:
 storing a plurality of recent recursive requests in an array of registers;
 comparing a new recursive request with each request in the array; and
 dropping any new recursive request that matches a request in the array.

7. The method of claim 6, wherein said step of suppressing further comprises deleting any request from the array of registers if the corresponding state is evicted from the NFA cell array.

8. The method of claim 4, further comprising determining a policy pre-fetch depth (PFD) value for each transition in the NFA.

9. The method of claim 8, wherein the pre-fetch parameter of each recursively generated request is limited to be no greater than the policy PFD value for the transition to the corresponding child state.

10. The method of claim 9, wherein the pre-fetch parameter of said original request is at least the maximum of the policy PFD values for all transitions from said absent NFA state.

11. A method of fetching destination NFA (nondeterministic finite automaton) states in a dynamically configurable NFA cell array, wherein a state present in the cell array is active and has at least one transition to at least one corresponding child state, said method comprising:
 determining a pre-fetch depth (PFD) value for each said at least one transition from the active state to said at least one child state, wherein said PFD value indicates a number of transitions from the current state to successive child states;
 transmitting all non-zero determined PFD values to each at least one corresponding child state;
 decrementing the transmitted PFD value at each state receiving a transmitted PFD value;
 transmitting all non-zero decremented PFD values to each successive child state of the state receiving the transmitted PFD value; and
 if any child state for which a non-zero PFD value is destined is absent from the NFA cell array, fetching the absent state into the NFA cell array.

12. The method of claim 11, further comprising determining a policy pre-fetch depth (PFD) value for each transition in the NFA.

13. The method of claim 12, wherein said determined PFD value for each said transition from the active state is the policy PFD value for that transition.

14. The method of claim 12, further comprising:
 limiting the decremented PFD value transmitted to said each successive child state to the policy PFD value for the transition to said each successive child state.

15. The method of claim 11, wherein the step of fetching the absent state into the NFA cell array comprises:
 generating an original request to fetch said absent NFA state into the cell array, the request having a pre-fetch parameter;
 returning instructions from an instruction memory to a loader for the absent state;
 configuring the absent state into the NFA cell array using said instructions; and
 if the pre-fetch parameter is greater than zero, recursively generating additional requests for each child state of the requested state, the recursively generated requests having pre-fetch parameters one less than the original request.

16. The method of claim 15, wherein the pre-fetch parameter of said original request is one less than said non-zero PFD value destined for said absent state.

17. The method of claim 15, further comprising determining a policy pre-fetch depth (PFD) value for each transition in the NFA.

18. The method of claim 17, wherein said determined PFD value for each said transition from the active state is the policy PFD value for that transition.

19. The method of claim 18, wherein the pre-fetch parameter of said original request is one less than said non-zero PFD value destined for said absent state.

20. The method of claim 11, further comprising, if additional space is required in the NFA cell array to load new states, evicting inactive states from the cell array.

21. The method of claim 20, wherein said step of evicting inactive states from the cell array comprises evicting only descendants of the active state that are more than one level removed from the active state.

22. The method of claim 21, wherein said step of evicting inactive states further comprises preventing state oscillation by limiting child state fetch requests so that an inactive state will only fetch an absent child state once for each continuous period that said inactive state receives a transmitted PFD value greater than one.

23. The method of claim 11, wherein the step of fetching the absent state into the NFA cell array comprises accessing referenced NFA instructions and sending the instructions to a loader, wherein the loader selects at least one available cell in the array and configures the at least one cell utilizing the accessed instructions.

24. A system for fetching destination NFA (nondeterministic finite automaton) states in a dynamically configurable NFA cell array, wherein a state is active and has a transition to at least one child state, said system comprising:
 a loader that is enabled to load states into the cell array;
 a plurality of instruction queues configured to provide instructions to the loader, comprising at least one external request queue, at least one external request recursive queue and at least one internal request queue;
 an instruction memory enabled to provide instructions to each of said plurality of instruction queues; and
 a recursive pre-fetch requester enabled to provide recursive pre-fetch requests to the instruction memory based on a pre-determined pre-fetch depth (PFD) value, said pre-determined PFD value being determined by a compiler for each transition in the NFA and indicating a number of transitions from the current state to successive child states;
 wherein said active state transmits all non-zero PFD values to each corresponding child state which is present in the NFA cell array; the child states decrement the transmitted PFD values received and recursively transmit all non-zero decremented PFD values to successive child states; the cell array provides an internal fetch request to the instruction memory to fetch the absent state into the NFA cell array when any child state for which a non-zero PFD value is destined is absent from the NFA cell array.

25. The system of claim 24, wherein if the decremented PFD value in any state is greater than the determined PFD value for a transition to a successive child state, the PFD value transmitted to the successive child state is limited to the determined PFD value.

26. The system of claim 24, wherein if additional space is required in the NFA cell array to load new states, inactive states are evicted from the cell array.

27. The system of claim 25, wherein if additional space is required in the NFA cell array to load new states, inactive states are evicted from the cell array.

* * * * *